United States Patent [19]

Bowers

[11] Patent Number: 4,751,065

[45] Date of Patent: Jun. 14, 1988

[54] REDUCTION OF NITROGEN- AND CARBON-BASED POLLUTANTS

[75] Inventor: Wayne E. Bowers, Clearwater, Fla.

[73] Assignee: Fuel Tech, Inc., Stamford, Conn.

[21] Appl. No.: 906,671

[22] Filed: Sep. 10, 1986

Related U.S. Application Data

[63] Continuation of Ser. No. 811,532, Dec. 20, 1985, abandoned, which is a continuation-in-part of Ser. No. 784,827, Oct. 4, 1985, abandoned.

[51] Int. Cl.⁴ .............................................. C01B 21/00

[52] U.S. Cl. .............................................. 423/235

[58] Field of Search .............................................. 423/235

[56] References Cited

U.S. PATENT DOCUMENTS

| | | | |
|---|---|---|---|
| 3,599,427 | 8/1971 | Jones et al. | 423/213.5 |
| 3,988,113 | 10/1976 | Roberts et al. | 422/177 |
| 4,208,386 | 6/1980 | Arand et al. | 423/235 |

FOREIGN PATENT DOCUMENTS

| | | | |
|---|---|---|---|
| 2630202 | 2/1977 | Fed. Rep. of Germany | 423/235 |
| 2752918 | 5/1979 | Fed. Rep. of Germany | 423/235 |
| 1110490 | 9/1976 | Japan | 423/235 |
| 0077877 | 6/1977 | Japan | 423/235 |
| 0112273 | 9/1978 | Japan | 423/235 |
| 0109866 | 9/1978 | Japan | 423/235 |

OTHER PUBLICATIONS

Chemical Abstracts 96:11125c Continuous Purification of Industrial Waste Gases Containing Formaldehyde, Hirche et al.

Chemical Abstracts 84:21673w Treatment of Nitrogen Dioxide Containing Gas Streams, Lawson.

Chemical Abstracts 94:213667a Separating Nitrogen Oxides from Gases, Qui Umann.

Chemical Abstracts 84:79119m Detoxification of Waste Gases Containing Nitrogen Oxides, Gisbier et al.

Chemical Abstracts 103:146519t Composition and Method for Simultaneous Separation of $SO_x$ and $NO_x$ from Flue Gases, Weber.

*Primary Examiner*—John Doll

*Assistant Examiner*—Lori S. Freeman

*Attorney, Agent, or Firm*—St. Onge Steward Johnston & Reens

[57] ABSTRACT

Disclosed is a process for reducing nitrogen oxides in an effluent from the combustion of a carbonaceous fuel under oxygen-rich conditions which minimize the production of carbon-based pollutants. A dispersion of a solution comprising at least one additive compound selected from the group consisting of guanidine, guanidine carbonate, biguanide, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and hexamethylenetetramine is injected into an effluent at a temperature above 1300° F., and preferably above 1500° F. The concentration of the additive compound in solution, the temperature of the effluent at the point of injection, and the size of the droplets in the dispersion, are selected to provide a reduction in nitrogen oxides. When urea is employed in combination with hexamethylenetetramine, the effectiveness of the urea is enhanced, particularly at temperatures 1800° F. and below.

15 Claims, No Drawings

REDUCTION OF NITROGEN- AND CARBON-BASED POLLUTANTS

RELATED APPLICATION

This is a continuation of co-pending application Ser. No. 06/811,532 filed on Dec. 20, 1985, which in turn is a continuation-in-part of copending application Ser. No. 06/784,827, filed Oct. 4, 1985 both now abandoned.

TECHNICAL FIELD

The present invention relates to improvements in the combustion of carbonaceous fuels, and more particularly to improvements in firing boilers with reduced emissions of carbon- and nitrogen-based pollutants.

Carbonaceous fuels burn more completely, with reduced emissions of carbon monoxide and unburned hydrocarbons, at oxygen concentrations and combustion air/fuel ratios which permit optimized high flame temperatures. When fossil fuels are used to fire large utility boilers, these temperatures are above 2000° F. and typically from about 2200° F. to 3000° F. Unfortunately, these high temperatures and hot spots of higher temperature tend to result in the production of thermal $NO_x$—the temperatures being so high that free radicals of nitrogen and oxygen are formed and chemically combine as nitrogen oxides ($NO_x$).

The flame temperature can be lowered to reduce $NO_x$ formation by the use of large excesses of air or fuel, or a hybrid of both processes known as staged combustion. However, these approaches create excessive carbon-based pollutants. There is no known set of conditions which can simultaneously reduce nitrogen- and carbon-based pollutants to acceptable levels without incurring severe economic penalties.

BACKGROUND ART

The need to reduce nitrogen- and carbon-based emissions while maintaining economic operation is a concern wherever carbonaceous fuels are burned. The requirements of each system for efficiency of fuel consumption must, of course, be considered in order to have a practical system.

In U.S. Pat. No. 3,599,427 to Jones et al, there is described a two stage catalytic system for treating the exhaust gases of mobile internal combustion engines. In the first catalytic stage, hot exhaust gases directly from an engine are treated at a high temperature to oxidize carbon monoxide and unburned hydrocarbons. The resulting exhaust gases are then cooled and passed through a separate, second catalytic stage to reduce levels of nitrogen monoxide. Prior to contact with the second stage catalyst, ammonia gas and other compounds such as urea, ammonium hydroxide, ammonium carbonate, and hexamethylenetetramine, are mixed with the exhaust gases. Upon contact with the second stage catalyst, nitrogen oxides are reduced to produce nitrogen and water.

In U.S. Pat. No. 3,846,981, Pacztowski discloses a more detailed, controlled two-stage catalytic system. The operating temperatures for the second catalytic stage where ammonia is utilized, are preferably within the range of from 275° F. to 900° F. This process and that of Jones et al unfortunately depend on the use of catalysts which create additional costs in terms of initial investment and servicing requirements.

In U.S. Pat. No. 3,900,554, Lyon discloses a non-catalytic system for reducing nitrogen monoxide (NO) in a combustion effluent. Lyon discloses that ammonia and specified ammonia precursors, including ammonium carbonate also disclosed by Jones, et al, or their aqueous solutions, can be injected into the effluent for mixing with the nitrogen monoxide at a temperature within the range of 1600° F. to 2000° F. In one embodiment of the disclosed process, a reducing agent, such as hydrogen gas or various hydrocarbons, can be mixed with the effluent to permit the reduction reaction to occur at temperatures as low as 1300° F., thereby assuring avoidance of high temperature oxidation of ammonia to nitrogen monoxide. Lyon points out that at temperatures above 2000° F., the use of ammonia was counterproductive—increasing NO rather than decreasing it.

Unfortunately, large industrial boilers operate at temperatures significantly above 2000° F., and access to the interior of the heat exchangers where the 1600° F. to 2000° F. temperature exists following the flame zone of the boilers is not practical without major redesign due to exterior water jacketing and interior water tubes. At the exhaust end of the boilers, the temperature is reduced far below the minimum temperature of 1300° F. which can be used when a reducing agent is employed. Thus, the effective temperature range cannot be readily accessed for non-catalytic operability of Lyon's teaching in many large industrial boilers and certain other $NO_x$-producing combustion equipment.

In U.S. Pat. No. 3,961,018, Williamson discloses the purification of acid gas-containing streams at low temperatures approaching ambient. Williamson discloses contacting the gas stream with an amine vapor in sufficient concentration such that its partial pressure is at least 5% of the total pressure of the gas stream. This system thus requires large amounts of the treating gas and requires equipment for separating that gas from the effluent upon completing the treatment.

In a somewhat different environment, Goldstein et al, in U.S. Pat. No. 4,061,597 indicate that temperatures within the range of 1000° to 1300° F. are effective when using urea for reducing brown fumes caused by nitrogen dioxide ($NO_2$) from catalyst treatment effluents. One example in the patent employs a 30 weight percent aqueous solution of urea. Again, however, the temperature range of 1000° F. to 1300° F. is not practical for treatment of effluents from many types of combustion equipment.

In U.S. Pat. No. 4,325,924, Arand et al disclose the non-catalytic urea reduction of nitrogen oxides in fuel-rich combustion effluents. They indicate that under fuel-rich conditions, aqueous solutions of urea at concentrations of greater than 10%, and preferably greater than 20%, are effective nitrogen oxide reducers at temperatures in excess of 1900° F. Unfortunately, this effluent from staged combustion results in the production of high levels of carbonaceous pollutants.

In U.S. Pat. No. 4,208,386, on the other hand, Arand et al disclose that for oxygen-rich effluents, the temperature is in the range of from 1300° F. to 2000° F. for urea added dry or as a solution in water alone or with an alkanoic solvent. The use of the alkanoic solvent is said to enable reduction of the effective operating temperature to below 1600° F. No function, other than carrier for the urea, was disclosed for the water.

Operation under fuel-rich conditions has the disadvantages that combustion has been incomplete and carbon-based pollutants are excessive. Thus, despite the apparent ability of Arand et al to add the urea solution to fuel-rich effluents at temperatures above 1900° F. for reduction of nitrogen-based pollutants, this fuel-rich operation has economic and environmental penalties. And, ,operation under oxygen-rich conditions to achieve the desirable economies of fuel utilization and reduced carbon-based pollutants, causes practical difficulties in supplying the urea, ammonia or other useful material to a boiler under conditions where it will have its intended effect of reducing the levels of nitrogen oxide pollutants. Moreover, the present invention shows that urea is not as effective as would be desired in reducing levels of nitrogen oxides.

Accordingly, there is a present need for a process which enables the more efficient reduction of nitrogen-based pollutants while operating under efficient oxygen-rich conditions which minimize carbon-based pollutants.

DISCLOSURE OF INVENTION

The present invention provides a process for reducing the concentration of nitrogen oxides in an oxygen-rich effluent from the combustion of a carbonaceous fuel. The process comprises injecting a solution comprising at least one additive compound selected from the group consisting of guanidine, guanidine carbonate, biguanide, guanylurea sulfate, melamine, dicyandiamide, calcium cyanamide, biuret, 1,1′-azobisformamide, methylol urea, methylol urea-urea condensation product, dimethylol urea, methyl urea, dimethyl urea, and hexamethylenetetramine, into said effluent. The temperature of the effluent at the point of injection, the concentration of the additive compound in the solution, and the size of the droplets in the dispersion, are selected to achieve reduction in nitrogen oxide levels in the effluent. A preferred embodiment of the invention provides for introducing an aqueous solution of hexamethylenetetramine and urea. Injection is preferably done at a plurality of spaced positions and at a uniform droplet size within the range of from about 10 to about 10,000 microns Sauter mean diameter. Variations of particle sizes within this broad range have been found effective to achieve uniform mixing of the additive compound with the effluent gas at a temperature in excess of 1300° F.

For the purposes of this description, all temperatures herein are measured using an unshielded K-type thermocouple. Droplet sizes are determined with a Malvern 2200 instrument, utilizing a Franhofer diffraction, laser-based system. And, unless otherwise indicated, all parts and percentages are based on the weight of the composition at the particular point of reference.

In addition to the named additive compounds, which can be employed alone or in combination, urea and materials such as ammonium carbonate, ammonium oxalate, ammonia, hydrazine, ammonium hydroxide, and various amines can be employed with the named additive compounds.

Aqueous solutions are preferred according to the present invention due to their economy and can be employed with suitable effectiveness in most situations. The effective solutions will vary from saturated to dilute. While water will be an effective solvent for most applications, there are instances where other solvents may be advantageous in combination with water.

The temperature of the effluent will have an influence on the concentration of the solution. At temperatures of from about 1300° F. to about 2000° F., the solution will tend to operate effectively at high concentration, e.g., from 25 to 40 weight percent. On the other hand, at temperatures in excess of 2000° F., the solution will tend toward very dilute solutions. At these high temperatures, the water may comprise greater than 80%, 85% or 90% by weight of the solution, with the additive compound comprising as low as from about 0.5 to about 10% by weight of the solution.

It has been found that at temperatures within the above range, and particularly below 1800° F. with fine atomization of the solution, hexamethylenetetramine is utilized to a greater extent than urea, being almost totally consumed during its interaction with $NO_x$ under proper conditions. It is further surprising that, when used in combination with urea, hexamethylenetetramine actually increases the utilization of the urea in reducing $NO_x$. Thus, hexamethylenetetramine is an enhancer for urea utilization in addition to being a superior $NO_x$ reducing agent in its own right.

Combinations of the named additive compounds are employed as $NO_x$ reduction optimization and economics dictate. Preferably, hexamethylenetetramine will be present in an amount of at least about 25% based on the combined weight of it and the other active $NO_x$ reducer such as urea. Weight ratios of hexamethylenetetramine to urea of from about 1:3 to 3:1 are exemplary.

The solution of additive compound will be dispersed uniformly within the effluent gas stream at a point where the effluent is at a temperature above 1300° F., and preferably above 1500° F. Large industrial boilers of the type employed for utility power plants and other large facilities, will typically be water jacketed and have access only at limited points. In the most typical situation, the boiler interior can be accessed only in the area of the flame and at an area above the flame, where the temperatures at full load are typically within the range of from about 2200° F. to about 2600° F. For boilers operating efficiently with gas, the temperature at this point of access will typically fall within the range of from about 2100° F. to about 2600° F., and when fired with coal or oil, will typically fall within the range of about 2050° F. to 2400° F. At these temperatures, the effective introduction of additive compound solutions can be accomplished at lower concentrations and employing dispersions having larger droplet sizes.

The additive compound solutions according to the present invention are preferably injected at a number of spaced points from nozzles which are effective to uniformly form and disperse droplets of the solutions within the flowing effluent stream to achieve uniform mixing. Preferably, the size of the droplets of solution will be within the range of from about 10 to about 10,000, and preferably within the range of from about 50 to 10,000 microns Sauter mean diameter. At temperatures below 2000° F., droplet sizes of less than 150 microns are quite effective, while at higher temperatures the droplets should be larger, preferably larger than 500 microns.

The concentration of the additive compound or compounds within the effluent gas should be sufficient to provide a reduction in nitrogen oxide levels. Typically, the additive compound will be employed at a molar ratio of nitrogen in the additive compound to the baseline nitrogen oxide level of from about 1 to 10 to 2 to 1, and will more preferably be within the range of from about 1 to 4 to 3 to 2.

BEST MODE FOR CARRYING OUT THE INVENTION

The following examples further illustrate and explain the invention by detailing the operation not only of a small scale burner, but also of a commercial utility boiler system, with reduction in nitrogen oxide emissions.

EXAMPLE 1

A home heating burner fitted with a 1.25 gallon per hour nozzle firing a slight excess of oxygen, was run for an initial period of time to establish baseline operating conditions, with oxygen ($O_2$) and nitrogen oxides ($NO_x$) measured and recorded as shown in the table below in two independent tests. In the test with urea, after reaching an operating temperature of 1550° F., a 7.2% (w/v) urea solution was sprayed at a rate of 240 ml/hour into the effluent at a point about six feet downstream of the burner nozzle, and values for $O_2$ and $NO_x$ were recorded at the temperatures indicated. In the test with hexamethylenetetramine (HMTA), again after reaching a temperature of 1550° F., a 9.5% (w/v) solution of hexamethylenetetramine was sprayed into the effluent at the same rate and point as the spray in test 1, and again values for $O_2$ and $NO_x$ were recorded at the indicated temperatures. For each test, the supply of solution was terminated when the indicated temperature reached 2000° F. The results are shown in table 1.

TABLE I

| | UREA | | | HMTA | | |
|---|---|---|---|---|---|---|
| Temp (°F.) | $O_2$ (%) | $NO_x$ (ppm)* | % $NO_x$ red. | $O_2$ (%) | $NO_x$ (ppm)* | % $NO_x$ red. |
| 1550 | 4.7 | 132 | — | 4.8 | 132 | — |
| 1600 | — | — | — | 4.7 | 85 | 36 |
| 1700 | 4.9 | 98 | 26 | 4.6 | 70 | 47 |
| 1800 | — | 107 | 19 | 4.6 | 87 | 34 |
| 1900 | — | 105 | 20 | — | 85 | 36 |
| 2000 | 4.9 | 110 | 17 | 4.9 | 86 | 35 |

*Corrected to 3.0% oxygen excess in effluent.

EXAMPLE 2

A Babcock & Wilcox 110 megawatt utility boiler was fired with residual fuel oil through ten Peabody burners to achieve 80 megawatt output. At 7 locations, about 48 feet above the uppermost burners, a series of medium-to-course droplet forming atomizers were positioned to inject treatment solutions into the effluent which was at an average temperature of about 1600° F. The following runs were made:

(1) a baseline run with no treatment solution;

(2) a 15 weight percent solution of hexamethylenetetramine (HMTA) in water supplied at a molar ratio of HMTA to baseline $NO_x$ of 0.125 and injected at 5 psi to give droplets having a Sauter mean diameter of from about 150 to 200 microns;

(3) the same conditions as (2), but injecting a hexamethylenetetramine solution of a concentration of only 6%; and (4) the same as (3), but employing a 15 weight percent solution of HMTA in water and supplying it at a molar ratio of HMTA to $NO_x$ of 0.5.

The tests are summarized, and the results recorded in Table 2.

TABLE 2

| Run | HMTA (Wt. %) | Molar Ratio (HMTA to NO) | NO (ppm)* | NO Reduction (%) |
|---|---|---|---|---|
| (1) | — | — | 222 | — |
| (2) | 15 | 0.125 | 184 | 17 |
| (3) | 6 | 0.125 | 187 | 16 |
| (4) | 15 | 0.5 | 101 | 55 |

*Corrected to 3.0% oxygen excess in the effluent.

EXAMPLE 3

The boiler referred to in Example 2 was fired to 108 megawatt output. Treatment solutions were injected into the effluent at an average effluent temperature of about 2100° F. The products of combustion contained a level of NO which equated to about 10 moles per hour. The following runs were made:

(5) a baseline run with no treatment solution;

(6) a 3.5% solution of urea in water supplied at a molar ratio of urea to baseline NO of 0.20 and injected to 5 psi to give droplets having a Sauter mean diameter of from about 150 to 200 microns, this solution supplying about 2 moles of urea per hour;

(7) as (6), but employing a combination of urea and hexamethylenetetramine (HMTA) at a molar ratio of chemicals to baseline NO of 0.18, this solution supplying about 1 mole per hour of urea and about 0.8 moles per hour of HMTA.

The tests are summarized, and the results recorded in Table 3.

TABLE 3

| Run | HMTA (Wt. %) | Urea (Wt. %) | Molar Ratio (to NO) | NO (ppm)* | NO Reduction (%) |
|---|---|---|---|---|---|
| (5) | — | — | — | 299.6 | — |
| (6) | — | 3.5 | 0.2 | 226.45 | 24.5 |
| (7) | 1.75 | 1.75 | 0.18 | 174 | 41.9 |

It can be noted from the data in Table 3 that the 24.4% reduction of NO achieved when using urea, utilizes only about half of the urea; but that the 41.9% reduction achieved when the combination is employed evidences near complete utilization of both the urea and HMTA.

EXAMPLE 4

The procedure of Example 1 is repeated for the additive compounds and combinations of them set forth in Table 4 below. The temperatures of the effluent, concentration of solutions, and feed rates are changed from Example 1 as indicated in Table 4.

TABLE 4

| Additive Compound | Concentration (w/v) | Feed Rate (ml/hr) | Temp (°F.) | $NO_x$ (ppm) Base Line | $NO_x$ (ppm) Treated | % Reduction |
|---|---|---|---|---|---|---|
| Biuret | 11.4% | 280 | 1800–1850 | 123 | 77 | 37.4 |
| Dimethylol Urea | 20% | 280* | 1800–1850 | 122 | 75 | 38.6 |
| Guanidine Carbonate | 10% | 280 | 1800–1850 | 120 | 80 | 33.3 |
| Guanylurea | 14.1% | 280* | 1800–1850 | 121 | 71 | 41.4 |

TABLE 4-continued

| Additive Compound | Concentration (w/v) | Feed Rate (ml/hr) | Temp (°F.) | $NO_x$ (ppm) Base Line | Treated | % Reduction |
|---|---|---|---|---|---|---|
| Sulfate | | | | | | |
| HMTA | 12% | 280 | 1800–1850 | 120 | 79 | 34.2 |
| Methylol Urea | 15% | 280* | 1800–1850 | 122 | 70 | 42.7 |
| Urea | 10% | 280 | 1800–1850 | 122 | 72 | 41 |
| Dimethyl Urea | 14.7% | 420 | 1790 | — | — | 42 |
| Methyl Urea | 12.3% | 420 | 1785 | — | — | 43 |
| Urea + HMTA | 7% & 3% | 420 | 1780 | — | — | 37.5 |
| 1,1'-azobis-formanide | 18.5% | 420 | 1790 | — | — | 52 |
| Melamine | 3.5% | 560 | 1800 | 115 | 90 | 21.8 |

*Additives were not completely soluble under conditions tested and $NO_x$ levels fluctuated with the indicated treated level being the low value.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

I claim:

1. A process for reducing the concentration of nitrogen oxides in an oxygen-rich effluent from the combustion of a carbonaceous fuel, which process comprises injecting an aqueous solution comprising hexamethylenetetramine into the effluent while the latter is at a temperature of at least 1300° F. in amounts sufficient to provide a molar ratio of hexamethylenetetramine to nitrogen oxides of from 1:6 to 2:1.

2. A process according to claim 1 wherein the ratio of hexamethylenetetramine to nitrogen oxides is from 1:4 to 1:1.

3. A process according to claim 1 wherein the solution is injected as a dispersion at a number of points, the droplets within the dispersion being within the range of from about 10 to about 10,000 microns Sauter mean diameter.

4. A process according to claim 3 wherein the droplets are greater than about 50 microns.

5. A process according to claim 1 wherein the dispersion is injected into the effluent at a temperature of from 2000° F. to 2500° F.

6. A process according to claim 5 wherein the solution comprises at least 80% solvent, based on the weight of the solution.

7. A process according to claim 6 wherein the solution comprises at least 90% solvent, based on the weight of the solution.

8. A process for reducing the concentration of nitrogen oxides in an oxygen-rich effluent from the combustion of a carbonaceous fuel, which process comprises injecting into said effluent while the latter is at a temperature of at least 1300° F. an aqueous solution of urea and hexamethylenetetramine at concentrations of urea and hexamethylenetetramine in the solution and of the solution within the effluent which are effective to reduce the level of nitrogen oxides in the effluent.

9. A process according to claim 8 wherein the temperature of the effluent is between 1300° F. and 1800° F. at the point of injection.

10. A process according to claim 9 wherein the solution is injected into the effluent in amounts sufficient to provide a molar ratio of hexamethylenetetramine to nitrogen oxides of from 1:6 to 2:1.

11. A process according to claim 9 wherein the ratio of hexamethylenetetramine to nitrogen oxides is from 1:4 to 1:1.

12. A process according to claim 8 wherein the weight ratio of hexamethylenetetramine to urea is from 1:3 to 3:1.

13. A process according to claim 8 wherein the solution is injected as a dispersion at a number of points, the droplets within the dispersion being within the range of from about 10 to about 10,000 microns Sauter mean diameter.

14. A process according to claim 13 wherein the droplets are greater than about 50 microns.

15. A process according to claim 13 wherein the dispersion is injected into the effluent at an effluent temperature of from 2000° F. to 2500° F. and the solution comprises at least 90% solvent.

* * * * *